United States Patent [19]

Bastioli et al.

[11] Patent Number: 5,292,782
[45] Date of Patent: Mar. 8, 1994

[54] BIODEGRADABLE POLYMERIC COMPOSITIONS BASED ON STARCH AND THERMOPLASTIC POLYMERS

[75] Inventors: Catia Bastioli, Novara; Vittorio Bellotti, Fontaneto D'Agogna; Alessandro Montino, Robbio Lomellina, all of Italy

[73] Assignee: Novamont S.p.A., Milan, Italy

[21] Appl. No.: 996,880

[22] Filed: Dec. 28, 1992

Related U.S. Application Data

[63] Continuation of Ser. No. 839,322, Feb. 20, 1992, abandoned.

[30] Foreign Application Priority Data

Feb. 20, 1991 [IT] Italy ............................... T091A000118

[51] Int. Cl.$^5$ ................................................ C08L 3/00
[52] U.S. Cl. ........................................ 524/47; 524/48; 524/52; 524/53; 524/56; 524/57; 524/58; 524/367; 524/368; 524/503
[58] Field of Search ................................ 524/47–48, 524/52–53, 56–58, 368, 367, 503, 83, 123, 124, 221

[56] References Cited

U.S. PATENT DOCUMENTS

| | | | |
|---|---|---|---|
| 2,850,468 | 9/1958 | Giggey | 524/53 |
| 3,652,542 | 3/1972 | Hjermstad | 260/233.3 |
| 3,720,633 | 3/1973 | Nickerson | 524/48 |
| 3,949,145 | 4/1976 | Otey et al. | 524/52 |
| 4,529,666 | 7/1985 | Salzburg et al. | 524/56 |
| 4,673,438 | 6/1987 | Wittwer | 106/126 |
| 4,863,655 | 9/1989 | Lacourse et al. | 264/53 |
| 4,900,361 | 2/1990 | Sachetto et al. | 106/213 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |

FOREIGN PATENT DOCUMENTS

| | | |
|---|---|---|
| 0032802 | 7/1981 | European Pat. Off. . |
| 0282451 | 9/1988 | European Pat. Off. . |
| 0304401 | 2/1989 | European Pat. Off. . |
| 0326517 | 8/1989 | European Pat. Off. . |
| 0327505 | 8/1989 | European Pat. Off. . |
| 0298920 | 11/1989 | European Pat. Off. . |
| 0400532 | 5/1990 | European Pat. Off. . |
| 0388924 | 9/1990 | European Pat. Off. . |

(List continued on next page.)

OTHER PUBLICATIONS

*Chemical Abstracts*, vol. 107, No. 8, p. 47, Abstract No. 60151n, F. H. Otey et al., "Starch-based blown films" (Aug. 24, 1987).

Otey, F. H. et al., Ind. Eng. Chem. Res. 26(8): 1659–63 (1987), "Starch-Based Blown Films".

Polyvinyl Alcohol Properties and Applications, C. A. Finch, 1973, p. 194 and Table 9.8.

*Primary Examiner*—Paul R. Michl
*Assistant Examiner*—LaVonda DeWitt
*Attorney, Agent, or Firm*—Bryan Cave

[57] ABSTRACT

A thermoplastic polymeric composition including starch, at least one synthetic thermoplastic polymer and a plasticiser in which the plasticiser is at least one compound selected from the group consisting of:

a) polyols formed by from 1 to 20 repeating hydroxylated units each including from 2 to 6 carbon atoms, provided that when the polyol is formed by only one repeating unit it has at least 4 carbon atoms, with the exclusion of sorbitol, b) ethers, thioethers, inorganic and organic esters, acetals and amino-derivatives of polyols formed by from 1 to 20 repeating hydroxylated units each including from 2 to 6 carbon atoms with the exclusion of acetic esters of glycerine, triethyl citrate and tributyl citrate, c) polyol reaction products having from 1 to 20 repeating hydroxylated units each including from 2 to 6 carbon atoms with chain extenders;

d) polyol oxidation products having from 1 to 20 repeating hydroxylated units each including from 2 to 6 carbon atoms including at least one aldehydic or carboxylic functional group or mixtures thereof.

21 Claims, No Drawings

FOREIGN PATENT DOCUMENTS

| | | |
|---|---|---|
| 0391853 | 10/1990 | European Pat. Off. . |
| 0404723 | 12/1990 | European Pat. Off. . |
| 0404727 | 12/1990 | European Pat. Off. . |
| 0404728 | 12/1990 | European Pat. Off. . |
| 0407350 | 1/1991 | European Pat. Off. . |
| 0408501 | 1/1991 | European Pat. Off. . |
| 0408502 | 1/1991 | European Pat. Off. . |
| 0408503 | 1/1991 | European Pat. Off. . |
| 0409781 | 1/1991 | European Pat. Off. . |
| 0409782 | 1/1991 | European Pat. Off. . |
| 0409783 | 1/1991 | European Pat. Off. . |
| 0409788 | 1/1991 | European Pat. Off. . |
| 0409789 | 1/1991 | European Pat. Off. . |
| WO90/10671 | 9/1990 | PCT Int'l Appl. . |
| 0413798 | 9/1990 | PCT Int'l Appl. . |
| WO91/02023 | 2/1991 | PCT Int'l Appl. . |
| WO91/02024 | 2/1991 | PCT Int'l Appl. . |
| WO91/02025 | 2/1991 | PCT Int'l Appl. . |
| 2190093 | 11/1987 | United Kingdom . |
| 8802313 | 3/1988 | United Kingdom . |

BIODEGRADABLE POLYMERIC COMPOSITIONS BASED ON STARCH AND THERMOPLASTIC POLYMERS

This is a continuation of U.S. application Ser. No. 07/839,322, filed Feb. 20, 1992, abandoned.

The present invention relates to thermoplastic polymeric compositions including starch and synthetic thermoplastic polymers and suitable for producing substantially biodegradable articles having satisfactory physical and mechanical properties by conventional techniques for the processing of thermoplastic materials.

Thermoplastic compositions of the type mentioned above are described in patent applications Nos. EP-A-32802, EP-A-327 505, EP-A-404 723, EP-A-404 727, EP-A-404 728 and EP-A-400532. Typically, these compositions are produced by the mixing of a starch with one or more synthetic thermoplastic polymers by means of a process which can destroy the crystallinity of the starch and create a structure which is interpenetrated or at least partially interpenetrated by the synthetic polymers. These processes may vary significantly in dependence on the chemical, physical and rheological characteristics of the synthetic component and the types of additives present.

Examples of these processes are described in patent applications Nos. EP-A-413798 and EP-A-400532.

The use of pharmaceutically-acceptable plasticising compositions with low molecular weights such as glycerine, acetic esters of glycerine, ethylene glycol, propylene glycol, sorbitol, sodium dioctylsulphosuccinate, triethyl citrate and tributyl citrate, in particular, in such compositions is known.

It has been found that, mainly because of changes in humidity and temperature undergone by articles produced by the processing of such plasticised compositions over a period of time, the articles are subject to the sweating (bleeding) and/or evaporation of the plasticiser which sometimes forms an oily film and sometimes crystalline dust on the surface of the article, thus limiting the article both from an aesthetic point of view and from the point of view of its handling.

The object of the present invention is to prevent the bleeding which takes place when known and conventional plasticisers are used.

For this purpose, a subject of the present invention is a thermoplastic polymeric composition including starch, at least one synthetic thermoplastic polymer and a plasticiser, and in which the starch and the polymer form a structure in which they are at least partially interpenetrated at the molecular level, characterised in that the plasticiser is at least one compound selected from the group consisting of:

a) polyols formed by from 1 to 20 repeating hydroxylated units each unit including from 2 to 6 carbon atoms, provided that when the polyol is formed by only one repeating unit it has at least 4 carbon atoms, with the exclusion of sorbitol, b) ethers, thioethers, inorganic and organic esters, acetals and amino-derivatives of polyols formed by from 1 to 20 repeating hydroxylated units each including from 2 to 6 carbon atoms with the exclusion of acetic esters of glycerine, triethyl citrate and tributyl citrate, c) polyol reaction products having from 1 to 20 repeating hydroxylated units each including from 2 to 6 carbon atoms with chain extenders, d) polyol oxidation products having from 1 to 20 repeating hydroxylated units each including from 2 to 6 carbon atoms including at least one aldehydic or carboxylic functional group or mixtures thereof.

Compounds which have vapour pressures lower than that of glycerine at ambient temperature (25° C.) and which are soluble in water are preferred.

The aliphatic polyols of type a) include compounds of the formula $$OH-CH_2-(CHOH)_n-CH_2OH \qquad (I)$$

in which n is from 2 to 4, such as erythritol, arabitol, adonitol, xylitol, mannitol, iditol, galactitol and allitol, and polyols which do not fall within the formula given above, such as trimethylolpropane, pentaerythritol, polyvinyl alcohol with from 3 to 20 repeating units and polyglycerol formed by from 2 to 10, preferably from 2 to 5, monomer units including mixtures of various oligomers.

The aliphatic polyol derivatives of paragraph b) preferably have structural formulae which can be obtained by the substitution of at least one alcoholic function of the polyol in question, which is preferably selected from those cited in the preceding paragraph including sorbitol, by a functional group selected from:

—O—$(CH_2)_n$—H in which n=1-18, preferably 1-4,

—O—CH=CH—$R_1$ in which $R_1$=H, or —$CH_3$,

—O(—$CH_2$—$CHR_1$—O$)_n$—H in which $R_1$=H, or $CH_3$ and n=1-20,

—O—$(CH_2)_n$—Ar in which Ar is a simple, substituted or heterocyclic aromatic radical and n=0-4,

—OCO—H,

—OCO—CR in which the $R_1$, $R_2$, and $R_3$ groups are the same or different and are selected from H, Cl and F, —OCO—$CH_2)_n$—H in which n=2-18, preferably 2-5,

—$ONO_2$,

—$OPO_3M_2$ in which M may be H, ammonium, an alkali metal, an alkaline earth or an organic cation, particularly trimethylammonium, pyridinium or picoline, —$SO_3$—Ar in which Ar is benzene or toluene, —OCO—CH($SO_3$M)—COOM in which the Ms are the same or different and are selected from H, an alkali metal, an alkaline earth, ammonium or an organic cation, particularly pyridinium, picoline or methylammonium, —OCO—B—COOM in which B is $(CH_2)_n$ where n=1-6 or —CH=CH—, M may be H, an alkali metal, an alkaline earth, —$(CH_2)_n$H where n=1-6 or an aryl group, —OCONH—$R_1$ in which $R_1$ may be —H or an aliphatic or aromatic radical, —O—$(CH_2)_n$—COOM in which n=1-6 and M may be H or an alkali metal, an alkaline earth, ammonium, or an organic cation, particularly pyridinium, trimethylammonium or picoline, —O—$(CH_2)_n$—$COOR_1$ in which n=1-6, $R_1$=H($CH_2)_m$— where m=1-6, —$NR_1R_2$ in which $R_1$ and $R_2$ =H, $CH_3$—, $CH_3CH_2$—, —$CH_2$—$CH_2OH$, or a salified amino group, —O—$(CH_2)_n$—$NR_1R_2$ in which n=1-4, $R_1$ and $R_2$ =H, $CH_3$—, $CH_3CH_2$—; or —$CH_2$—$CH_2OH$ and in which the amino group may be salified, $$-O-CH_2-CH\underset{O}{\overset{}{\diagdown\diagup}}CH_2,$$

—O—CH$_2$—CHOH—CH$_2$—NR$_1$R$_2$ in which R$_1$ and R$_2$ are the same or different and are selected from H, and H(CH$_2$)$_n$ where n=1-6, and in which the amino group may be salified, —O—CH$_2$—CHOH—CH$_2$—R$_1^+$Cl$^-$ in which R$_1^+$ is trialkylammonium, pyridinium or picoline, —O—(CH$_2$)$_n$R$_1$Cl$^-$ in which n=1-6 and R$_1$ is trialkylammonium, pyridinium or picoline, —O—(CH$_2$)$_n$—CN in which n=1-6, —O—(CH$_2$)$_n$—CONH$_2$ in which n=1-6, —O—(CH$_2$)$_m$—SO$_2$—(CH$_2$)$_n$—H in which m and n=1-4,

—SCSNH$_2$,

—O—SiX$_3$ and —O—SiOX$_3$ in which X may be an aliphatic or an aromatic radical.

Mono- and di-ethers and mono- and di-esters of the polyols of formula (I) given above are particularly preferred and monoethoxylate, monopropoxylate and monoacetate derivates, particularly of sorbitol, are most preferred.

The compounds of paragraph c) result from the joining of two or more polyol molecules by means of chain extenders such as bicarboxylic acids, aldehydes and isocyanates, in particular.

Preferred are compounds of the formula:

R—CH$_2$—(CHR)$_n$—CH$_2$—O—A—O—CH$_2$—(CHR)$_m$—CH$_2$—R in which n and m have the same or different values from 1 to 6, the R groups are the same or different and are hydroxyl groups or have the meaning given above, and in which A is selected from the group consisting of —CHR$_1$, R$_1$=H or H—(CH$_2$)$_n$— where n=1-5 (acetals), —(CH$_2$)$_n$— where n=1-6, —(CH$_2$—O—CH$_2$)$_n$ in which n=1-20, —(CH$_2$CH$_2$—O)$_n$—CH$_2$CH$_2$— in which n=1-20, —OC—(CH$_2$)$_n$—CO— in which n=0-6, —OC—Ar—CO— in which Ar is an aromatic radical which is also heterocyclic,

—PO$_2$—,

—CONH—(CH$_2$)$_n$NHCO—, and compounds of the formula:

R—CH$_2$—(CHR)$_n$—CH$_2$—A—CH$_2$—(CHR)$_m$—CH$_2$—R in which n and m are the same or different and are whole numbers from 1 to 6, the R groups are the same or different and are hydroxyl groups or have the meaning given above and in which A is selected from the group consisting of —NH— and —NH—(CH$_2$—CH$_2$—NH)$_n$— in which n is a whole number from 1 to 6.

Of the compounds given above, compounds in which only one of the R groups is a group forming an ether or an ester are preferred.

The term "polyol" is intended to include mono- and polysaccharides with up to 20 monosaccharide units.

The following monosaccharides come into consideration in particular:

pentoses and their derivatives of the formula:

$$R-CH-(CHR)_3-CH_2 \quad (II)$$
$$\underset{\phantom{xx}O\phantom{xx}}{\underline{\phantom{xxxxxxxxxxx}}}$$

in which the R groups are the same or different and are hydroxyl groups or have the meaning given above.

Examples of such compounds are arabinose, lycose, ribose and xylose and, preferably, monoethers and monoesters thereof, aldohexoses and their derivatives of the formula:

$$\begin{array}{c} CH_2R \\ | \\ H-C-(CHR)_3-CH-R \\ \underline{\phantom{xx}O\phantom{xxxx}} \end{array} \quad (III)$$

and ketohexoses and their derivatives of the formula:

$$\begin{array}{c} CH_2R \\ | \\ H-C-(CHR)_3-CH_2 \\ \underline{\phantom{xx}O\phantom{xxxx}} \end{array} \quad (IV)$$

in which the R groups are the same or different and are hydroxyl groups or have the meaning given above.

Examples of these monosaccharides are glucose, fructose, mannose, allose, altrose, galactose, gulose, iodose, inositol, sorbose and talitol.

Of their etherified or esterified derivatives, monoethoxylate and monopropoxylate derivatives and monoesters, particularly of acetic acid, are preferred.

The polysaccharides include compounds having up to 20 repetitive units of formula (II), (III) or (IV) with molecular weights up to that of dextrin.

The R functional groups may be introduced into the basic polyol structure by known reactions, for example as described in Chapter 9 and in the literature cited in the publication "Polyvinyl alcohol" edited by C. A. Finch.

The oxidation products of the polyols of paragraph d) are obtained by the reaction of the polyols in question with periodic acid, hypochlorite or lead tetra-acetate.

The starch used in the polymeric compositions is preferably a native starch, particularly maize starch, but the term starch is intended also to include physically and chemically modified starches such as those cited in the same Applicant's applications Nos. EP-A-413798 and EP-A-400532.

For the synthetic polymeric component, the hydrophilic or essentially hydrophobic polymers described in the literature may be used in the starchy compositions. Of these, ethylene copolymers containing more than 50% by weight of ethylene and having melting points between 80° and 130° C., such as ethylene-acrylic acid, ethylene-vinyl alcohol, ethylene-vinyl acetate and mixtures thereof are considered in particular.

However, particularly preferred are polyvinyl alcohols and ethylene-vinyl alcohol copolymers with ethylene contents of less than 40% by weight with various degrees of hydrolysis, produced by the hydrolysis of the corresponding polyvinyl acetate or ethylene vinyl acetate respectively. The degree of hydrolysis of the ethylene-vinyl alcohol copolymer is preferably between 100% and 50%.

The alcoholic units of the polymers mentioned above may be partly or wholly modified to produce:

1) ethers resulting from reaction with:

ethylene oxide,
ethylene oxide substituted by alkyl radicals up to $C_{20}$ or by aromatic radicals,
acrylonitrile ($Ce^{2+}$ initiator),
acrylamide,
arylalkyl halides,
chloroacetic acid,
methylchloromethyl ether,
silanes 2) inorganic and organic esters such as sulphates, nitrates, phosphates, arsenates, xanthates, carbamates, urethanes, borates, titanates, 3) organic esters resulting from reactions with aliphatic or aromatic acids, chloroacyls, particularly of fatty acids or anhydrides, 4) acetals and ketals produced by reaction with:
aliphatic aldehydes with up to 22 carbon atoms,
unsaturated aliphatic aldehydes with up to 22 carbon atoms,
chloroacetaldehyde,
glyoxal,
aromatic aldehydes,
cyclic aliphatic aldehydes,
aliphatic ketones
arylalkyl ketones,
alkylcycloalkyl ketones.

The reactions to produce the organic and inorganic esters and the acetals given above can easily be achieved as described in Chapter 9 and the literature cited in the publication "Polyvinyl alcohol" edited by C. A. Finch.

It is also possible to use polyvinyl alcohol and ethylene-vinyl alcohol multifunctional polymers (with ethylene contents of up to 40% by weight and degrees of hydrolysis of the acetate of between 100 and 50%) in which up to 50% of the ethylene may be substituted by co-monomers selected from the group consisting of:

propylene, isobutene, styrene, vinyl chloride, 1,1-dichloroethene, vinyl ethers of the formula $CH_2=CR-OR'$ in which R is hydrogen or a methyl group and R' is an alkyl group with from 1 to 18 carbon atoms, a cycloalkyl group or a polyether, acrylonitrile, methacrylonitrile, vinyl ketones of the formula $CH_2=CR-CO-CH_2-R'$ in which R is hydrogen or a methyl group and R' is hydrogen or a $C_1-C_6$ alkyl group, acrylic or methacrylic acid or their esters of the formula $CH_2=CR-COOR'$ in which R is hydrogen or a methyl group and R' is hydrogen or a $C_1-C_6$ alkyl group and the alkali metal or alkaline earth salts of these acids, vinyl derivatives of the formula $CH_2=CR-O-COR'$ in which R is hydrogen or a methyl group and R' is hydrogen, a methyl group, a methyl group mono-, bi- or tri-substituted with chloro or fluoro groups or $C_2-C_6$ alkyl groups, vinylcarbamates of the formula $CH_2=CR-CONR'R''$, in which R is hydrogen or a methyl group and R' and R" are the same or different and are hydrogen or $C_1-C_3$ alkyl groups, maleic anhydride, fumaric anhydride, vinylpyrrolidone, vinylpyridine, or 1-vinylimidazole.

The copolymerisation is achieved with the use of radical initiators such as hydrogen peroxide, peroxysulphates and benzoyl peroxides, as described in the chapter "Polymerisation processes of vinyl esters" and the literature cited on pages 406 et seq of Volume 17 of the "Encyclopedia of Polymer Science and Engineering".

The aforementioned plasticisers may also be used in compositions including starch, a first synthetic component selected from ethylene-vinyl alcohol copolymer, possibly modified polyvinyl alcohol and mixtures thereof and a further synthetic component comprising one or more polymers such as hydrophobic polymers of polyethylene or of its vinyl copolymers such as those cited above, or aliphatic polyesters (e.g. polyvinyl acetate, polycaprolactone, polyhydroxybutyrate (PHB) and polyhydroxybutyrate valerate (PHBV), polylactic acid, polyethylene and polybutylene adipates or sebacates), polyethers (e.g. polyoxymethylene, polyoxyethylene, polyoxypropylene, polyphenylene oxide), polyamides (nylon 6, nylon 12, etc.) polyacrylonitrile, polyurethanes, polyester/polyurethane copolymers, polyester/polyamide copolymers, polyglycolide or hydrophilic polymers such as: polyvinyl pyrrolidone, polyoxazoline, cellulose acetates and nitrates, regenerated cellulose, alkyl cellulose, carboxymethyl cellulose, casein-type proteins and salts thereof, natural gums such as gum arabic, algin and alginates, chitin and chitosan.

The relative proportions of starch and synthetic co-polymer in the composition may vary within wide limits and is generally between 1:99 and 99:1 (anhydrous starch/synthetic polymer), preferably between 1:9 and 9:1.

As far as the biodegradability properties of the polymeric compositions produced are concerned, the compositions with high starch contents and particularly compositions in which the anhydrous starch content is from 20 to 80% of the total quantity of anhydrous starch and synthetic polymer are preferred.

When a blend of synthetic polymers is used, including the above mentioned first and second hydrophobic or hydrophilic synthetic component, the weight ratio of said component is preferably between 1:6 and 6:1.

The concentration of the plasticiser may vary within wide limits in dependence of the mechanical properties to be obtained in the articles produced with the use of the polymeric composition. The concentration of the plasticiser is preferably from 1 to 50% and most preferably from 5 to 40% of the total composition by weight.

The polymeric material may also include agents which can destroy hydrogen bonds, such as urea and alkali-metal or alkaline-earth hydroxides which are added to the starch and copolymer mixture in quantities of between 0.5 and 20% of the weight of the entire composition.

The polymeric material may also include cross-linking agents, such as aldehydes, ketones and glyoxals, process coadjuvants and release and lubricating agents normally incorporated in compositions for moulding or extrusion, such as fatty acids, fatty-acid esters, higher alcohols, polythene waxes, fungicides, flame-proofing agents, herbicides, antioxidants, fertilisers, opacifiers and stabilisers.

The polymeric composition is preferably prepared by the mixing of the components cited above in an extruder heated to a temperature generally between 100° and 220° C. The composition supplied to the extruder includes water due to the intrinsic water content of the starch used (9-15% by weight) and water may be added as appropriate.

In order to produce articles with suitable mechanical properties as a result of the moulding or extrusion of the polymeric composition, the water content of the total composition is preferably reduced by intermediate degassing during the extrusion to a water content which varies according to the transformation technology and the degree of rigidity required of the final material.

The pressures to which the mixture is subjected during the heat treatment are typical for extrusion in single- and double-screw extruders. Although the process is preferably carried out in an extruder, the starch, synthetic polymer and plasticiser may be mixed by any device which ensures conditions of temperature and shearing stress suitable to render the starch and the polymer used compatible from a rheological point of view.

If synthetic polymers with high melting points, such as, for example, polyvinyl alcohol and ethylene-vinyl alcohol copolymer with ethylene contents no greater than 40% by weight are used, in particular, the plasticisers described also perform an important function in the process which leads to the formation of a composition with an (at least partially) interpenetrated structure. The melting points of these polymers (160°-200° C.) are so high that complete interpenetration with the starch molecules is impossible; the addition of plasticisers common to the starchy and polymeric components lowers the melting points of the synthetic polymers and at the same time changes their rheological behaviour.

Solely for this function, and with the synthetic polymers cited in the present description which have melting points of the order of 160°-200° C., conventional plasticisers such as ethylene glycol, propylene glycol, sorbitol and glycerine can also be used either alone or mixed with the plasticisers described.

The preferred method of preparing the compositions of the invention includes the following steps:

swelling the starch and synthetic polymer by means of the plasticiser and possibly water at a temperature between 80° and 180° C. with a dynamic change in their melting points and rheological behaviour; this effect can be achieved, for example, during a first stage of the transportation of the components in an extruder, for periods of the order of 2 to 50 seconds, subjecting the mixture to shearing conditions corresponding to similar viscosity values of the two components so as to cause the interpenetration of the molecules of the two components, degassing the mixture freely, under controlled pressure or under vacuum to produce a melt at a temperature of 140°-180° C. with a liquid content such that bubbles are not created at atmospheric pressure, that is, for example, at the output of the extruder.

cooling the finished product in a water bath or in air.

The whole method requires a pressure of between 0.5 and 10 MPa, preferably between 1 and 5 MPa.

As stated, the thermoplastic composition is preferably prepared by mixing the components cited directly; the starch may, however, also be treated beforehand in the presence of a plasticiser, possibly with added water, at a temperature of from 100° and 220° to produce a thermoplastic starch. This starch can be mixed with the synthetic polymer and a further quantity of plasticiser in a second step. For polyvinyl alcohol and ethylene-vinyl alcohol copolymer, a portion of the total quantity of plasticiser is added at the start of the mixing of the pretreated starch and the synthetic polymer since the plasticiser itself has to be available to modify the melting point and rheological behaviour of the polymer in order to make it compatible with the starch.

When a blend including a first synthetic component and a second synthetic component, as previously defined, is used, the process for preparing the compositions according to the invention may also be carried out by blending the first synthetic component with starch and plasticiser to obtain pellets and then blending such pellets with the second synthetic component in a subsequent extrusion step.

EXAMPLE 1

Comparative 37 parts of Globe 3401 starch (11% by weight of water), 37 parts of ethylene vinyl alcohol with an ethylene content of 42% in moles and a degree of hydrolysis of the acetate groups of 99.5%, 3 parts of ethylene-acrylic acid copolymer with 20% of acrylic acid and a melt flow of 2 (at 125° C. and a 0.325 kg load), 0.3 parts of Armid E, 5 parts of urea, 15 parts of glycerine, and 2.7 parts of water were mixed in a single-screw OMC extruder with a diameter d of 20 mm and an L/d of 30, operating with the following temperature profile: 90°-180°-150°-140° C. and having an intermediate degassing section. The extruded and granulated product which had a water content of 3.2% by weight was then moulded in an injection press to form plates with dimensions of 70×70×1 mm which were then inserted in a climatic cell programmed to carry our cycles from 20° C. and 30% relative humidity to 30° C. and 80% relative humidity over 6 hours for a total of 20 cycles.

After this treatment, the plates were oily.

EXAMPLE 2

A composition corresponding to that of the comparative Example 1 in which the glycerine was replaced by a polyglycerol formed by condensation and having an average glycerine content of 4 moles.

The plates obtained and treated as described in Example 1 showed neither significant bleeding nor loss of plasticiser during the aging period.

EXAMPLE 3

Comparative

A composition identical to that of Example 1 was used but with the use of sorbitol instead of glycerine.

At the end of the heating cycles, the plates had an aesthetically-unacceptable white dusty surface appearance.

EXAMPLES 4-12

Compositions identical to those of Example 1 were used with the glycerine replaced as indicated below.

In all cases the appearance of the plates after the heating cycles was aesthetically good since they did not appear oily and were not receptive to fingerprints neither did the plates show any loss of plasticiser over the period.

| Example No. | Plasticiser |
| --- | --- |
| 4 | Sorbitol acetate |
| 5 | Sorbitol diacetate |
| 6 | Sorbitol monoethoxylate |
| 7 | Sorbitol diethoxylate |
| 8 | Sorbitol dipropoxylate |
| 9 | Sorbitol hexapropoxylate |
| 10 | Aminosorbitol |
| 11 | Trihydroxymethylaminomethane |
| 12 | Glucose/PEG (20 moles PEG) product of the reaction of glucose with ethylene oxide. |

Some of the compositions given above were filmed by blowing.

The mechanical characteristics of the films produced were generally good and in some cases better than the formulations with glycerine.

| Example | Load MPa | Extension % | Modulus MPa | Energy KJ/m$^2$ |
|---|---|---|---|---|
| 1 | 15 | 330 | 180 | 1650 |
| 3 | 14 | 250 | 155 | 1400 |
| 4 | 11 | 360 | 165 | 1700 |
| 5 | 10 | 180 | 240 | 1250 |
| 6 | 18 | 340 | 280 | 2150 |
| 7 | 13 | 310 | 160 | 1650 |
| 8 | 14 | 310 | 170 | 1540 |
| 9 | 10 | 35 | 390 | 650 |

Other plasticisers include:
trimethylolpropane monethoxylate,
mannitol monoacetate,
mannitol monoethyoxylate,
butyl glucoside,
alpha-methyl glucoside,
glucose monoethyoxylate,
the sodium salt of carboxymethylsorbitol,
polyglyercol monoethoxylate (degree of polymerisation 3.9).

In the compositions according to the invention, and in the articles formed from these compositions, starch and the synthetic polymer form a structure which is at least partly interpenetrated at the molecular level. Particularly in the case of compositions in which the synthetic polymeric component comprises ethylene-vinyl alcohol polymer with the concentrations of starch and polymer in a ratio of from 1:4 to 4:1, the composition is considered to have an at least partly interpenetrated structure when one or more of the following phenomena occur:

the starchy phase cannot be separated from the ethylene vinyl alcohol phase (EVOH) by making use of the solubility of the starch. This phenomenon can be observed not only in cold water but also in water at 100° C. In this case, the sample tends to break up but the separated particles retain the same proportions of EVOH and starch (FTIR method), a microstructure observed by TEM which may exhibit a complete absence of phases or the presence of phases with dimensions smaller than 0.3 microns; the phases are mixed with each other without clear outlines, the presence in the tg delta spectrum, upon dynamic-mechanical analysis, of a single beta transition linked to the mobility of the —OH groups of both the components with a modification of the peak from that of starch, mechanical properties close to those of PE at a T of 23° C. and 50% humidity. Extensibility between 80 and 600% and breaking energy comparable with those of PE are achieved. These characteristics are far removed from those of the two starting products.

Moreover, phase separation would tend to reduce the extensibility and breaking energy.

This whole set of characteristics can be explained as resulting from "entanglements" of starch and EVOH chains which are made stronger than the amylopectin "branches", and the stabilisation of the structure by hydrogen bonds. This explanation is in no way binding with reference to the scope of the protection of the invention.

Formed articles, films, sheets and fibres produced from the polymeric compositions by injection moulding, extrusion, blow-extrusion, thermoforming and similar conventional methods for thermoplastics materials fall within the scope of the invention.

Specific applications comprise: films for nappies, mulch, packaging in general, films for protective coatings or films coextruded with biodegradable and non-biodegradable polymers, injection mouldings for syringe parts, tampon applicators, plant pots, etc., thermoformed trays, bowls, blister packs, combinations with aluminium, paper or other polymers, extrusions such as cotton-wool sticks, sheets for thermoforming, folders for stationery, etc., products expanded solely by water or by gases such as $CO_2$, applications in the packaging and hamburger-tray sectors and the like, fibres for wadding, non-woven fabrics and melt blow, bottles and containers produced by blow moulding.

We claim:

1. A thermoplastic polymeric composition comprising starch, at least one synthetic thermoplastic polymer, and a plasticizer, wherein the starch and the polymer form a structure in which they are at least partially interpenetrated at the molecular level, said composition being obtained by melting at least part of the starch in the presence of the plasticizer, said plasticizer being:

(a) a compound selected from the group consisting of R—$CH_2$—$(CHR)_n$—$CH_2$—R wherein n is an integer from 2 to 4, $CH_3$—$CH_2$—$C(CH_2R)_3$, $C(CH_2R)_4$, a vinylic polymer having repeating units of the formula —$(CH_2CHR)_n$— wherein n is an integer from 3 to 20, and H($OCH_2$—CHR—$CH_2)_nR$ wherein n is an integer from 2 to 10, wherein R is selected from the group consisting of:

—O—$(CH_2)_n$—H in which n is 1-18,

—O—CH=CH—$R_1$ in which $R_1$ is H or —$CH_3$,

—O(—$CH_2$—$CHR_1$—O)$_n$—H in which $R_1$ is H or $CH_3$ and n is 1-20,

—O—$(CH_2)_n$—Ar in which Ar is a simple, substituted, or heterocyclic aromatic radical and n is 0-4,

—OCO—H,

—OCO—$CR_1R_2R_3$ in which the $R_1$, $R_2$, and $R_3$ groups are the same or different and are selected from H, Cl, and F, —OCO—$(CH_2)_n$—H in which n is 2-18,

—$ONO_2$,

—$OPO_3M_2$ in which M is H, ammonium, an alkali metal, an alkaline earth, or an organic cation, —$SO_3$—Ar in which Ar is benzene or toluene, —OCO—CH($SO_3M$)—COOM in which the Ms are the same or different and are selected from the group consisting of H, an alkali metal, an alkaline earth, ammonium, and an organic cation, —OCO—B—COOM in which B is $(CH_2)_n$ where n is 1-6 or —CH=CH—, and M is H, an alkali metal, an alkaline earth, —$(CH_2)_n$H where n is 1-6, or an aryl group, —OCONH—$R_1$ in which $R_1$ is H or an aliphatic or aromatic radical, —O—$(CH_2)_n$—COOM in which n is 1-6 and M is H, an alkali metal, an alkaline earth, ammonium, or an organic cation, —O—$(CH_2)_n$—$COOR_1$ in which n is 1-6, $R_1$ is H$(CH_2)_m$— where m is 1-6, —$NR_1R_2$ in which $R_1$ and $R_2$ are the same or different and are H, $CH_3$—, $CH_3CH_2$—, —$CH_2$—$CH_2OH$, or a salified amino group, —O—$(CH_2)_n$—$NR_1R_2$ in which n is 1–4, $R_1$ and $R_2$ are the same or different and are H, $CH_3$—, $CH_3CH_2$—, or —$CH_2$—$CH_2OH$, and in which the amino group may be salified,

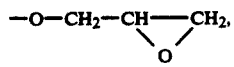

—O—$CH_2$—CHOH—$CH_2$—$NR_1R_2$ in which $R_1$ and $R_2$ are the same or different and are selected from the group consisting of H, $H(CH_2)_n$ where n is 1–6, and in which the amino group may be salified, —O—$CH_2$—CHOH—$CH_2$—$R_1{}^+Cl^-$ in which $R_1{}^+$ is trialkylammonium, pyridinium, or picoline, —O—$(CH_2)_nR_1{}^+Cl^-$ in which n is 1–6 and $R_1{}^+$ is trialkylammonium, pyridinium, or picoline, —O—$(CH_2)_n$—CN in which n is 1–6, —O—$(CH_2)_n$—$CONH_2$ in which n is 1–6, —O—$(CH_2)_m$'$SO_2$—$(CH_2)_n$—H in which m and n are the same or different and are 1–4,

—$SCSNH_2$,

—O—$SiX_3$ and —O—$SiOX_3$ in which X may be an aliphatic or an aromatic radical, and hydroxyl, wherein at least one of the R substituents is different from hydroxyl;

(b) compound of the formula:

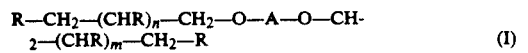

(I)

in which n and m have the same or different values from 1 to 6, the R groups are the same or different and have the meaning attributed to R in subparagraph (a) of this claim, and in which A is selected from the group consisting of:

—$CHR_1$— where $R_1$ is H or H—(H—$(CH)_n$— where n is 1–5,

—$(CH_2)_n$— where n is 1–6,

—$(CH_2$—O—$CH_2)_n$ where n is 1–20,

—$(CH_2CH_2$—O$)_nCH_2CH_2$— where n is 1–20,

—OC—$(CH_2)_n$—CO— where n is 0–6,

—OC—Ar—CO— in which Ar is a heterocyclic aromatic radical,

—$PO_2$—, and

—CONH—$(CH_2)_n$NHCO—;

(c) a compound of the formula:

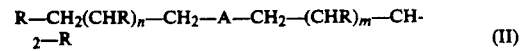

(II)

in which n and m are the same or different and are whole numbers from 1 to 6, the R groups are the same or different and have the meaning attributed to R in subparagraph (a) of this claim, and in which A is selected from the group consisting of —NH— and —NH—$(CH_2$—$CH_2$—NH$)_n$— in which n is a whole number from 1 to 6;

(d) a compound of the formula:

(III)

in which the R groups are the same or different and have the meaning attributed to R in subparagraph (a) of this claim;

(e) an aldohexose or a derivative thereof of the formula:

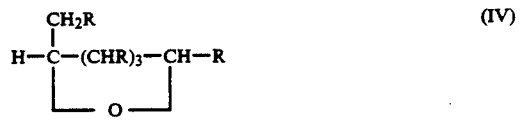

(IV)

or a ketohexose or a derivative thereof of the formula:

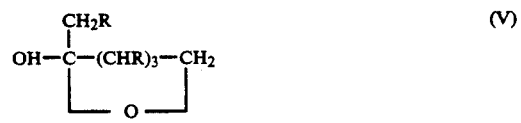

(V)

in which the R groups are the same or different and have the meaning attributed to R in subparagraph (a) of this claim; or (f) a polyol oxidation product having from 1 to 20 repeating hydroxylated units each including from 2 to 6 carbon atoms including at least one aldehydic or carboxylic functional group or mixtures thereof.

2. A polymeric composition according to claim 1 in which the plasticizer is a monoethoxylate, monopropoxylate, or monoacetate derivative of sorbitol or of a compound selected from the group consisting of polyglycerol having from 2 to 10 monomeric units, polyvinyl alcohol having from 3 to 20 monomeric units, erythritol, arabinol, adonitol, xylitol, mannitol, iditol, galoctitol, allitol, trimethylolpropane, and pentaerythritol.

3. A composition according to claim 1 in which the plasticizer is a compound of formula (III), (IV), or (V) in which one of the R groups has the meaning attributed to it in subparagraph (a) of claim 1 other than hydroxyl and the rest of the R groups are hydroxyl groups.

4. A composition according to claim 1, in which the plasticiser is selected from the group consisting of arabinose, lycose ribose, xylose, glycose, fructose, mannose, allose, altrose, galactose, gulose, iodose, inositol, sorbose, talitol and monoethoxylate, monopropoxylate and monoacetate derivatives thereof.

5. A composition according to claim 1 in which the plasticizer (f) is the product of oxidation by an oxidising reagent selected from the group consisting of periodic acid, hypochlorite, and lead tetraacetate.

6. A composition according to claim 1, in which the weight of the plasticiser is from 1 to 50%, of the weight of the composition.

7. A composition according to claim 1, in which the thermoplastic polymer is selected from the group consisting of polyvinyl alcohol, ethylene-acrylic acid, ethylene-vinyl acetate, ethylene-vinyl alcohol, modified ethylene-vinyl alcohol, modified polyvinyl alcohol and mixtures thereof.

8. A composition according to claim 7 including a polymer of ethylene vinyl alcohol produced by the hydrolysis of the corresponding ethylene vinyl acetate with a degree of hydrolysis of the acetate groups of from 50 to 100% and an ethylene content less than 40% by weight.

9. A composition according to claim 7 including a polymer of ethylene vinyl alcohol or polyvinyl alcohol having alcoholic functional groups which are at least partly etherified by reaction with a compound selected from the group consisting of ethylene oxide either unsubstituted or substituted by $C_1$-$C_{20}$ alkyl radicals or aromatic radicals, acrylonitrile, acrylamide, arylalkyl halides, chloroacetic acid, methylchloromethylether and silanes.

10. A composition according to claim 7 including a polymer of ethylene vinyl alcohol or polyvinyl alcohol including esterified alcoholic functional groups selected from the group consisting of sulphates, nitrates, phosphates, arsenates, xanthates, borates, titanates, urethanes and carbamates.

11. A composition according to claim 7 including a polymer of ethylene vinyl alcohol or polyvinyl alcohol including alcoholic functional groups esterified by reaction with aliphatic or aromatic acids, chloroacyls or anhydrides.

12. A composition according to claim 7 including a polymer of ethylene vinyl alcohol or polyvinyl alcohol including acetal functional groups produced by reaction with compounds selected from the group consisting of saturated and unsaturated aliphatic aldehydes having up to 22 carbon atoms, aromatic aldehydes, cycloaliphatic aldehydes, chloroacetaldehyde, glyoxal, aliphatic ketones, alkylcycloalkyl ketones and arylalkyl ketones.

13. A composition according to claim 7 including a multifunctional copolymer of ethylene-vinyl alcohol with an ethylene content up to 40% by weight and a degree of hydrolysis of the acetate between 100 and 50% in which up to 50% of the ethylene may be replaced by co-monomers selected from the group consisting of: propylene, isobutene, styrene, vinyl chloride, 1,1-dichloroethene, vinyl ethers of the formula $CH_2=CR-OR'$ in which R is hydrogen or a methyl group and R' is an alkyl group with from 1 to 18 carbon atoms, a cycloalkyl group or a polyether, acrylonitrile, methacrylonitrile, vinyl ketones of the formula $CH_2=CR-CO-CH_2-R'$ in which R is hydrogen or a methyl group and R' is hydrogen or a $C_1$-$C_6$ alkyl group, acrylic or methacrylic acid or their esters of the formula $CH_2=CR-COOR'$ in which R is hydrogen or a methyl group and R' is hydrogen or a $C_1$-$C_6$ alkyl group and the alkali metal or alkaline earth salts of these acids, vinyl derivatives of the formula $CH_2=CR-O-COR'$ in which R is hydrogen or a methyl group and R' is hydrogen, a methyl group, a methyl group mono- bi- or tri-substituted by chloro- or fluoro groups or $C_2$-$C_6$ alkyl groups, vinylcarbamates of the formula $CH_2=CR-CONR'R''$, in which R is hydrogen or a methyl group and R' and R" are the same or different and are hydrogen or $C_1$-$C_3$ alkyl groups, maleic anhydride, fumaric anhydride, vinylpyrrolidone, vinylpyridine, or 1-vinylimidazole.

14. A composition according to claim 7 comprising starch, ethylene-vinyl alcohol copolymer and/or polyvinyl alcohol, optionally modified, and further comprising a polymer selected from the group of polymers consisting of polyethylene and its vinyl copolymers, polyvinyl acetate, polycaprolactone, PHB, PHBV, polylactic acid, polyethylene and polybutylene adipates and sebacates, polyoxymethylene, polyoxyethylene, polyoxypropylene, polyphenylene oxide, polyamides, polyacrylonitrile, polyurethanes, polyester/polyurethane copolymers, polyesters/polyamide copolymers, polyglycolide, and hydrophilic polymers.

15. Articles formed from a polymeric composition according to claim 1.

16. A method of preparing a polymeric composition according to any one of claim 1, characterised in that it includes the step of mixing starch, a synthetic polymer, a plasticiser and possibly water under temperature and pressure conditions of between 100° and 220° C. and from 0.5 to 100 MPa.

17. A method of preparing a polymeric composition according to claim 16 including the steps of:
a) mixing starch, a synthetic polymer and a plasticiser at a temperature between 80° and 180° C. for a period such that the plasticiser causes the bulking of the starch and the polymer,
b) subjecting the mixture thus obtained to shearing conditions corresponding to similar viscosity values of the starchy and synthetic components so as to cause the interpenetration of the two components at the molecular level.

18. A method according to claim 17 in which the mixture in a) includes water and including a step for degassing the mixture obtained in b) at a temperature from 140° to 180° C. so as to obtain a molten mixture with a liquid content such as to avoid the formation of bubbles at atmospheric pressure.

19. A method according to claim 17 in which the mixing periods in step a) are from 2 to 50 seconds.

20. A method according to claim 17, in which the mixture is kept under a pressure of from 0.5 to 10 MPa during steps a) and b).

21. The composition of claim 14 wherein said hydrophilic polymers are selected from the group consisting of polyvinyl pyrrolidone, polyoxazoline, cellulose acetates and nitrates, regenerated cellulose, alkyl cellulose, carboxymethyl cellulose, casein-type proteins and salts thereof, natural gums, chitin, and chitosan.

* * * * *